United States Patent [19]

Sosson et al.

[11] Patent Number: 4,770,399
[45] Date of Patent: Sep. 13, 1988

[54] PROCESS FOR THE MOUNTING OF A GROUP OF COMPONENT PARTS ON A SUPPORT ELEMENT, IN PARTICULAR PARTS OF A TIMING GEAR OF A HEAT ENGINE, AND A PACKING PRINT FOR CARRYING OUT THIS PROCESS

[75] Inventors: Pierre Sosson, Maisons Laffitte; Bernard Kohler, La Celle Saint Cloud, both of France

[73] Assignee: Compagnie des Transmissions Mecaniques Sedis, Levallois-Perret, France

[21] Appl. No.: 811,139

[22] Filed: Dec. 19, 1985

[30] Foreign Application Priority Data

Dec. 21, 1984 [FR] France .................. 84 19728

[51] Int. Cl.$^4$ ............................................. B25B 1/20
[52] U.S. Cl. .................................... 269/40; 269/287; 206/486; 206/523; 206/589
[58] Field of Search .................. 269/40, 287; 29/271; 206/478, 489

[56] References Cited

U.S. PATENT DOCUMENTS

| | | | |
|---|---|---|---|
| 1,075,983 | 10/1913 | Lebenhart | 206/489 |
| 1,533,588 | 4/1925 | Ellis | 269/40 |
| 1,904,674 | 4/1933 | Blumenthal | 269/40 |
| 2,353,954 | 7/1944 | Duffy et al. | 269/40 |
| 2,743,693 | 5/1956 | Schaper | 269/40 X |
| 3,432,026 | 3/1969 | O'Leary | 206/478 X |

Primary Examiner—Frederick R. Schmidt
Assistant Examiner—Judy J. Hartman
Attorney, Agent, or Firm—Sughrue, Mion, Zinn, Macpeak, and Seas

[57] ABSTRACT

The packing print for receiving in particular component parts (2-7) of a timing gear of a heat engine provided with a camshaft and a crankshaft, comprises cavities (2a, 3a, 4a, 5a) adapted to receive the component parts (2-7), in particular a camshaft wheel (2), a crankshaft pinion (3), a tension-producing device (5) and a guiding device (7) for a transmission chain (4) or belt associated with the pinion (3) and the wheel (2), these cavities being so arranged that the component parts (2-7) received therein are pre-positioned and pre-oriented with respect to one another in the exact positions they must occupy on the engine so as to permit the mounting of the component parts simultaneously on the engine. This print permits carrying out the mounting very rapidly with no risk of error in the positioning of the component parts.

6 Claims, 4 Drawing Sheets

PROCESS FOR THE MOUNTING OF A GROUP OF COMPONENT PARTS ON A SUPPORT ELEMENT, IN PARTICULAR PARTS OF A TIMING GEAR OF A HEAT ENGINE, AND A PACKING PRINT FOR CARRYING OUT THIS PROCESS

The present invention relates to a process for mounting a group of component parts on a support element in given relative positions and orientations, and in particular parts of a timing gear of a heat engine, and to a packing print for carrying out this process.

It is known that on present assembly lines of engine producing units, the various parts required for the driving of the camshaft, and possibly other accessories such as an injection pump, are mounted in succession at one or more work stations. For example, there are mounted in succession the crankshaft toothed pinion, then the element or elements for putting under tension and guiding, then the shaft toothed wheel, and lastly the transmission element constituted by a chain or a belt.

In the course of these mounting operations, the specifications of the relative setting between the various elements, in particular the setting between the crankshaft, the camshaft and possibly the injection pump, must be scrupulously conformed to. It is found at the present time that the mounting of the parts of a timing gear of a heat engine thus involves:

the procurement, the handling, the storing and the managing of a large number of parts, a great number of mounting operations requiring considerable time, numerous persons and a large amount of space, multiple operations which are difficult to render automatic, a care and attention in these mounting operations which, while requiring a large amount of time, necessitate checkings for detecting possible error in the assembly which might result in the destruction of the engine when it is operated for the first time.

An object of the invention is therefore to avoid these requirements and inconveniences by providing a process for mounting component parts on the support, and a print or packing for carrying out this process which substantially improves the productivity and the reliability of the mounting of the various parts of the assembly.

The invention provides a mounting process comprising disposing the parts in a print where they are pre-positioned, pre-oriented and maintained in positions corresponding to those that they must occupy on their support element, then presenting this print, with the parts placed therein, in front of the support element in accordance with the suitable orientation, fixing said parts to the support element without extracting them from the print and, after the fixing of the parts, removing the print.

This process, which is applicable to each case where a g r o u p of parts must be assembled on a support element in well-defined positions and orientations, has many possible applications in the mechanical industry, and in particular in the automobile industry, but also in other various industrial fields such as electric, electronic and and building engineering, etc..

In the case where the process according to the invention is applied to the mounting on a heat engine comprising a camshaft and a crankshaft of parts of a timing gear of this engine, the process comprises packing the parts of the timing gear in a print in which are formed receiving impressions for the various parts dimensioned and arranged in such manner as to g r i p said parts so as to retain them in the case of an over-turning of the print and to assure the positions and the orientations of the parts of the timing gear according to the exact positions and orientations they must occupy on the engine, then presenting this print with the parts in front of the engine, fixing the parts to the latter while they are still in the print, owing to the provision of openings in the print which permit passing the means for fixing the parts and then removing the print.

Another object of the invention is to provide a print for carrying out this process and the assembly constituted by the print provided with the component parts.

The invention provides a packing print for an assembly of component parts on a support element adapted to carry out the aforementioned process and comprising cavities adapted to receive various component parts and for pre-positioning and pre-orienting the parts with respect to one another in the exact positions that they must occupy on the support element, said cavities being so dimensioned as to grip the component parts so as to retain them during the handling of the print before mounting the parts on the support element, openings being provided in the print to permit the passage, from the rear of the print, of elements for fixing the parts on the support element while the component parts are still in the print.

According to an embodiment of the print more particularly adapted to receive component parts of a timing gear of a heat engine, the print comprises cavities adapted to receive the component parts of the timing gear, in particular a camshaft toothed wheel, a crankshaft toothed pinion, elements for putting under tension and guiding a transmission chain or belt associated with the pinion and with the wheel, and said cavities are so arranged that the component parts received therein are pre-positioned and pre-oriented with respect to one another in accordance with the exact positions that they must occupy on the engine, so as to permit the mounting of the component parts simultaneously on the latter.

As the print is made for example from a plastics material in the form of a block of rigid foam or a thermoformed sheet, the cavities are so dimensioned that their walls g r i p the corresponding component parts and openings for the passage of elements for fixing the component parts are provided in the print, in particular for screws for fixing the camshaft toothed wheel, the crankshaft toothed pinion, a tensioning device and a guide for the transmission element and, possibly for other accessories such as a toothed wheel for an injection pump.

Thus, as the component parts of the timing gear are previously pre-mounted and pre-positioned with respect to one another, in the positions that they must occupy when mounted on the engine, it is sufficient to present in a single unit the print provided with the component parts in front of the end of the engine and then carry out the fixing operations without previously extracting the component parts from the print; these operations may if desired be advantageously rendered automatic and effected simultaneously.

Further features and advantages of the invention will be apparent from the following description with reference to the accompanying drawings which illustrate two embodiments by way of non-limiting examples:

Figure 1:
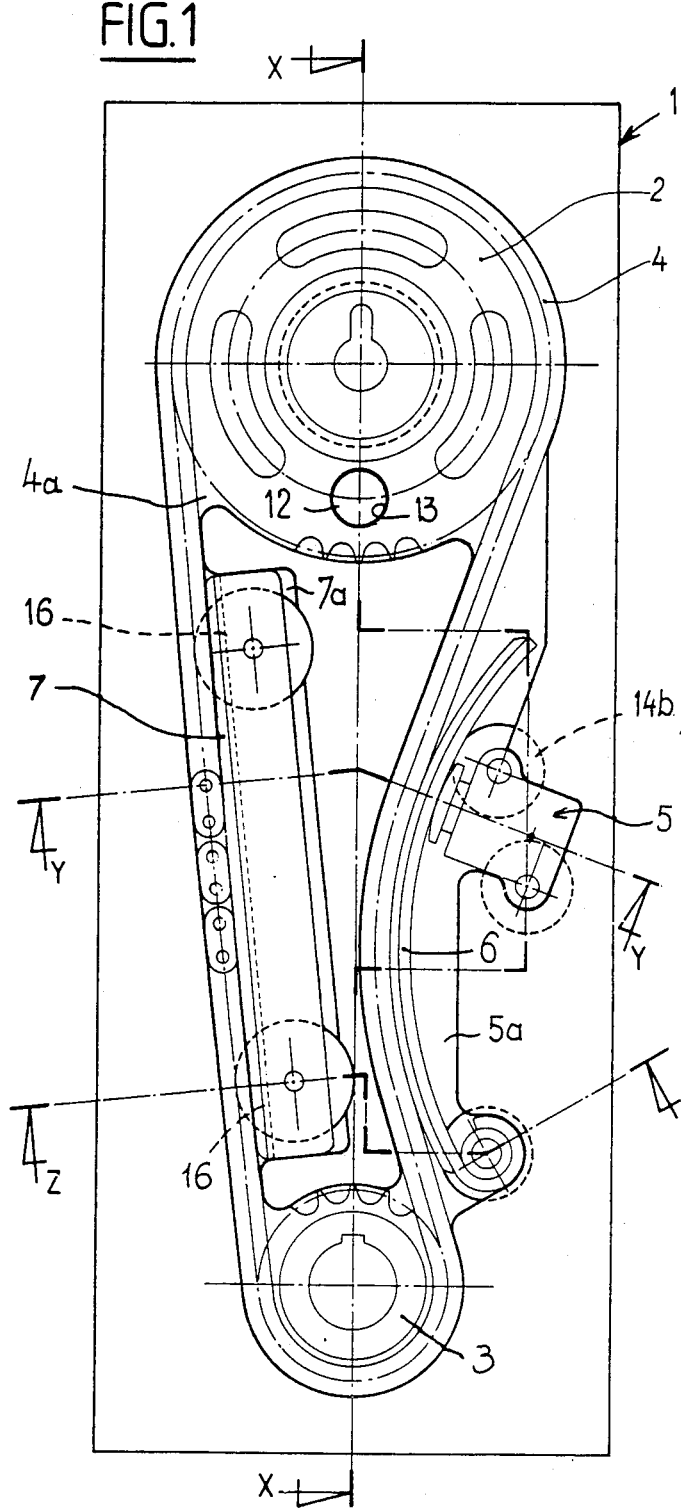
FIG. 1 is a plan view of a first embodiment of the print or packing according to the invention containing the various component parts of a timing gear of a heat engine viewed from the side to be presented to the engine.

FIGS. 1 to 5 show a print or packing 1 made from a suitable rigid foam of plastics material such as polyethylene foam and adapted to receive the component parts of a timing gear of a heat engine M (FIG. 5) provided with a camshaft 22 and a crankshaft 23.

The print or impression 1 comprises cavities adapted to receive the component parts of this timing gear, namely, in the presently-described example: a cavity 2a in which may be placed a camshaft wheel 2, a cavity 3a receiving a crankshaft toothed pinion 3, a cavity 5a which opens onto the cavities 2a, 3a and receives an element for transmitting motion between the pinion 3 of the crankshaft 23 and the wheel 2 of the camshaft 22, constituted in the presently described example by a chain 4 engaged on the wheel 2 and the pinion 3, this chain 4 extending consequently also in the cavities 2a and 3a. The cavity 5a also receives a strip 6 which is part of the tensioning device 5 and which is applied against the slack side of the chain 4.

The taut side of the chain 4 extends in a cavity 4a which is extended laterally and in its upper part by another cavity 7a which receives a guide 7 having an L-section shape of which one branch extends in the cavity 4a and carries a bearing member 7b in contact with the taut side of the chain 4.

Figure 2:
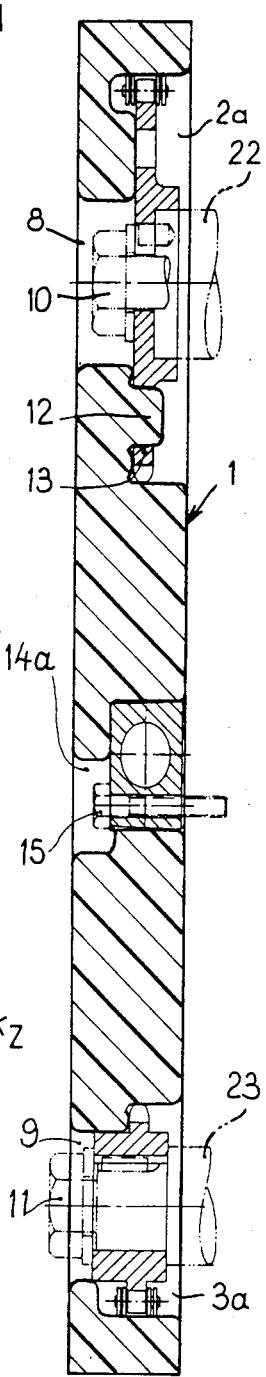
FIG. 2 is a longitudinal sectional view of the print and the component parts of FIG. 1 taken on the axis X—X.
Figure 3:
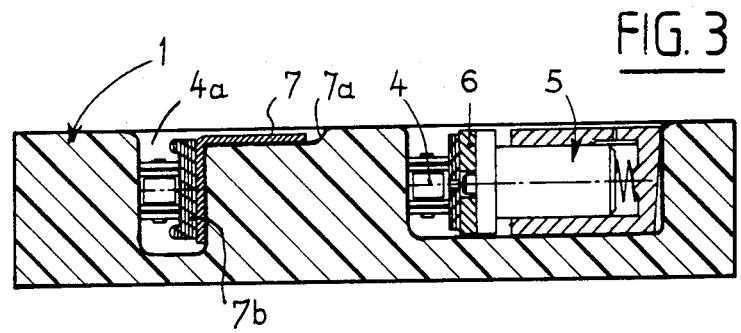
FIG. 3 is a cross-sectional view taken on line Y—Y of FIG. 1.
Figure 4:
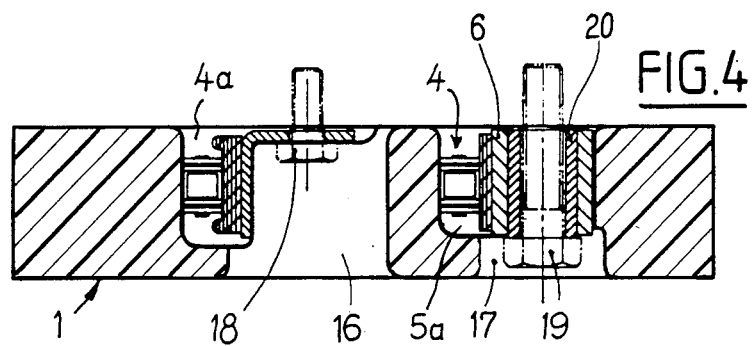
FIG. 4 is a cross-sectional view taken on line Z—Z of FIG. 1.
Figure 8:
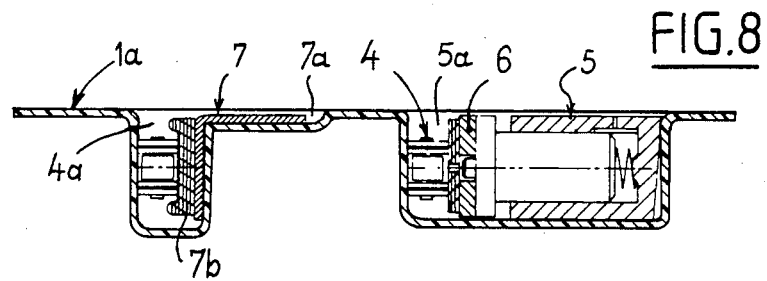
FIGS. 6, 7, 8 and 9 are respectively similar to FIGS. 1 to 4 of a second embodiment of the print according to the invention.
Figure 9:
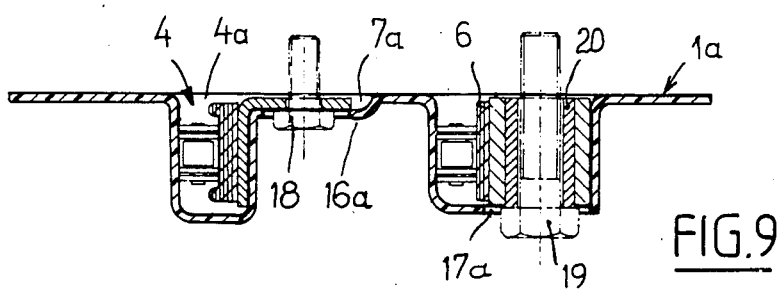

The print 1 is provided with a first opening or clearance 8 providing access to a screw 10 fixing the wheel 2 to the camshaft 22 (shown in dot-dash lines in FIG. 2), a second opening 9 opening onto the cavity 3a and permitting access to a screw 11 for fixing the pinion 3 to the crankshaft 23 (shown in dot-dash lines in FIG. 2). Two other openings 14a, 14b open onto the cavity 5a and allow access to two screws 15 fixing the tensioning device 5 to the engine M, two openings 16 are provided under the guide 7 and permit access to two screws 18 for fixing this guide 7 to the engine, and an opening or clearance 17 communicates with the cavity 5a in the vicinity of the pinion 3 and permits access to a screw 19 for the pivotal mounting of the strip 6 on a spacer member 20.

The openings 8, 9, 14a, 14b, 16, 17 formed passages in the print 1 and therefore permit access through the rear of the latter to the respective screws 10, 11, 15, 18 and 19.

A fool-proof device, constituted in the presently described example by a boss 12 of the print 1, enters an aperture 13 of the wheel 2 so as to guarantee its orientation relative to the pinion 3 without ambiguity.

Figure 5:
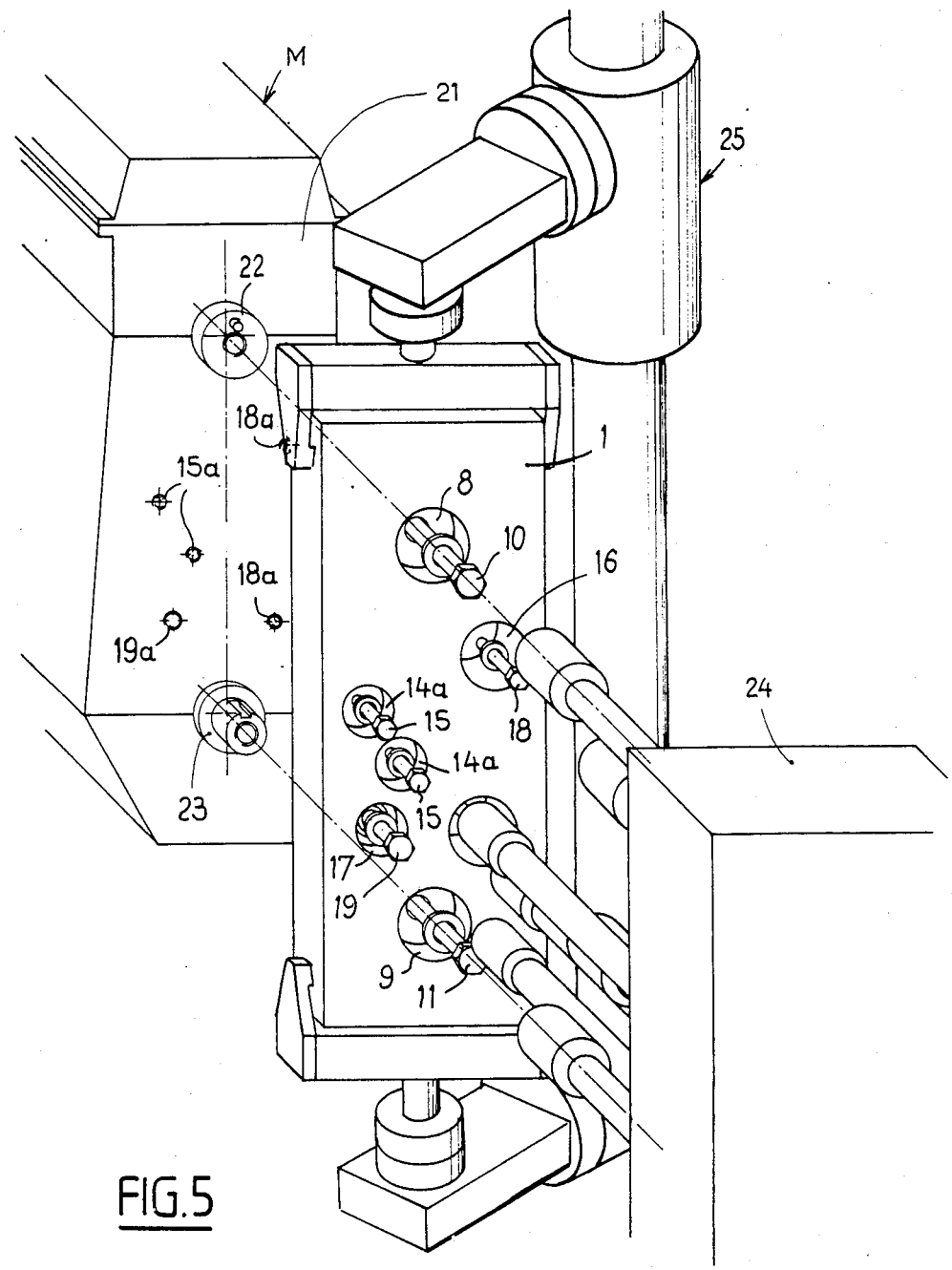
FIG. 5 is a perspective view illustrating the operation of the mounting on the end of the heat engine of the component parts of the timing gear shown in FIGS. 1 to 4.
Figure 6:
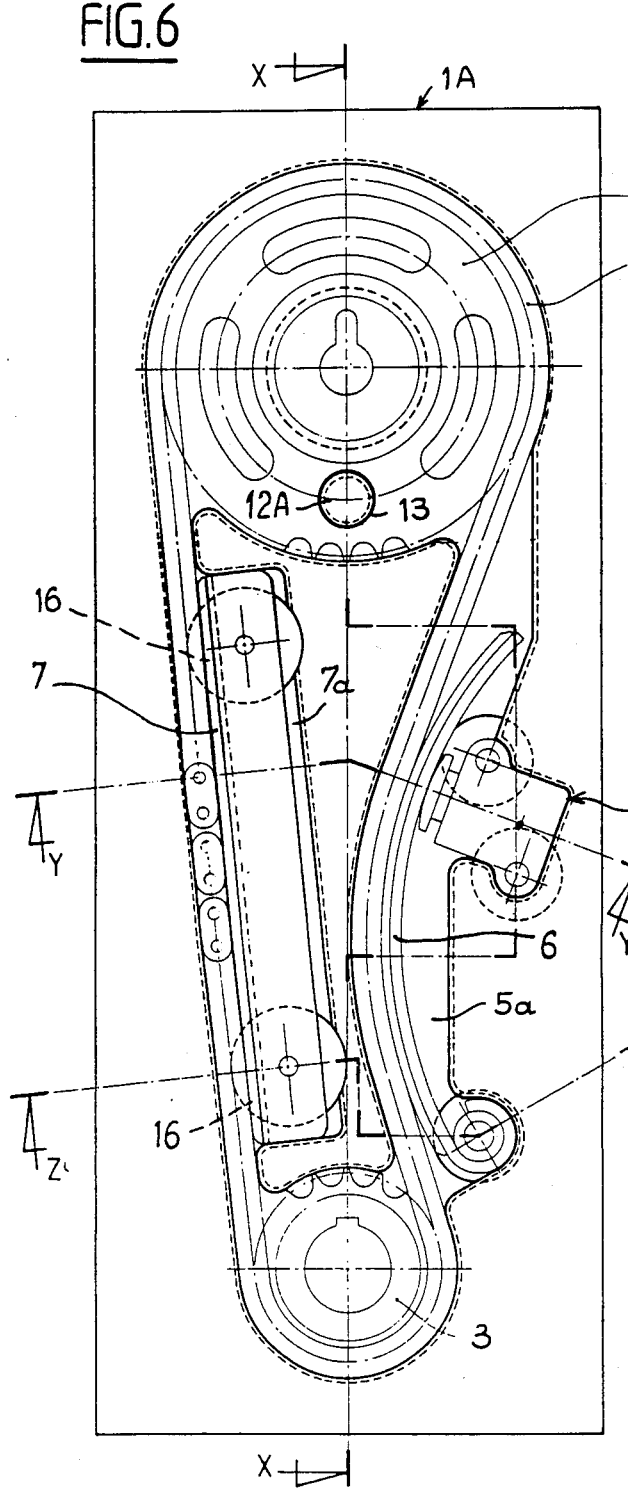
Figure 7:
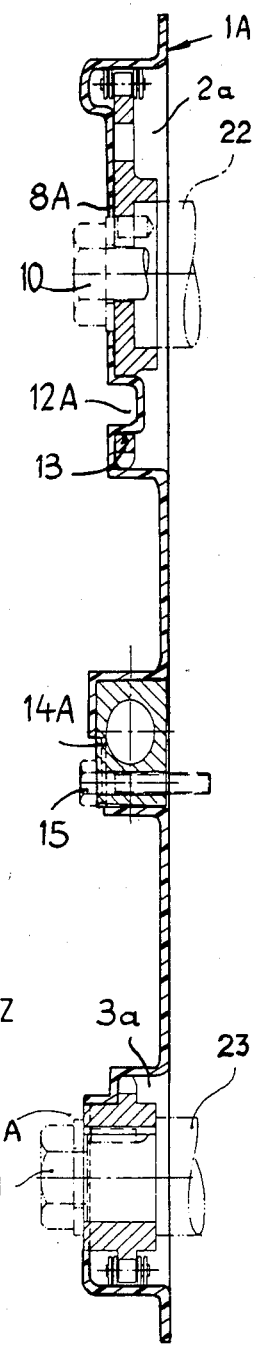

The end of the engine M is provided with screwthreaded holes 15a, 18a and 19a adapted to receive the screws 15, 18 and 19 respectively (FIG. 5).

All the cavities 2a, 3a, 4a, 5a ... mentioned above are so dimensioned that the corresponding component parts 2, 3, 4, ... can be received therein only by exerting a slight force so that the walls of these cavities grip these parts and hold them in position irrespective of the orientation of the print 1 provided with the component parts of this timing gear during its handling before mounting on the engine M. In particular, this gripping prevents the parts from falling away from the print when the latter is completely turned over.

The mounting process according to the invention carried out with the print 1 just described is as follows.

With all the component parts described above prepositioned and pre-oriented suitably in their cavities in the exact respective positions they must occupy on the end of the engine M, the print 1 is presented with the component parts in a vertical position in front of the engine M (FIG. 5), the wheel 2 and the pinion 3 are respectively engaged on the camshaft 22 and the crankshaft 23 and fixed in position by means of the screws 10, 11. The tension producing element 5 and guiding element 7 are then screwed in position by screwing the corresponding screws 15, 18 and 19 in their holes 15a, 18a, 19a. By way of a modification, the print 1 may be presented advantageously by means of a robot 25 and all the screwing operations may be advantageously carried out simultaneously and automatically by a screwing device 24 (FIG. 5).

Finally, the print 1 is removed or torn away since the mounting is now finished.

The invention affords important advantages to manufacturers of engines:

the procurement of supplies, the handling, the storing and the management of a single unit ie. the print provided with its component parts;

all of the component parts of the timing gear are mounted simultaneously at a single work station so that there is a saving in time, personnel and space which is considerable;

the mounting operation may be rendered automatic by means of a robot such as 25 and a screwing device such as 24, all the screwing operations being then simultaneous;

the use of the print or packing 1 renders any mounting or assembly error impossible, the specifications of relative setting between the various component parts being assured by the arrangement of the cavities receiving these parts.

The second embodiment of the print according to the invention, illustrated in FIGS. 6 to 9, differs from the first embodiment in that the print 1A is here constituted by a thermoformed sheet. In the latter, the cavities 2a, 3a, ... of the various component parts are identical to those of the print 1. On the other hand, the openings or clearances 8A, 9A, 14A, 16A, 17A corresponding to the openings 8, 9, 14, ... of the first embodiment, are here constituted by simple apertures in the sheet 1A, with respect to which the screws 10, 11, 18, ... project. The boss 12 of the print 1 is replaced in this second embodiment by a hollow boss 12A for centering the wheel 2.

It must be understood that the scope of the invention is not intended to be limited to the embodiments described hereinbefore since many constructional variations may be envisaged, in particular due to the fact that various other accessories (not shown), such as an injection pump wheel, may be provided in cavities provided for this purpose in the print. As already mentioned, the invention is applicable to fields other than the automobile industry.

What is claimed is:

1. A packing print block having parallel front and rear faces for mounting a group of mechanical component parts on a support structure in given exact positions and orientations of the component parts, means for permitting the mounting of the component parts simultaneously on the support structure, said means comprising a plurality of cavity means, located between said faces and open to said front face, for receiving and gripping the component parts and for pre-positioning and pre-orienting them with respect to one another in said exact positions that they must occupy on the support structure, and opening means in some of said cavity means for permitting passage through said rear face of said print block of fixing elements for fixing the component parts to the support structure while the component parts are still in said print block; wherein said cavity means are so dimensioned as to receive and grip the component parts during handling of said print block before the mounting of the component parts on the support structure, such that said cavity means are in gripping relation to respective ones of said component parts.

2. A print block accoding to claim 1, wherein two of said cavity means are shaped to receive and grip a camshaft wheel and a pinion, respectively, of a heat engine, and further comprising interengageable means on said print block for engaging said camshaft wheel as as to pre-orient said wheel relative to said pinion.

3. A print block according to claim 2, wherein said interengageable means comprises boss means on said print block for engaging an aperture in said wheel.

4. A print block according to claim 1, made from a rigid block of foam.

5. A print block according to claim 1, wherein walls of said cavity means form gripping means for gripping the respective component parts.

6. A print block according to claim 2, wherein a third one of said cavity means is shaped to receive a motion-transmitting belt in engagement with both the camshaft wheel and pinion, said third one of said cavity means extending between, and opening into, said two cavity means.

* * * * *